(12) United States Patent
Razzaghi

(10) Patent No.: US 7,064,461 B2
(45) Date of Patent: Jun. 20, 2006

(54) ELECTROMAGNETIC POWER DEVICE

(76) Inventor: Ahmad Razzaghi, Carl Malmstensv, 12, 4 tr, Solna (SE) 170 73

( * ) Notice: Subject to any disclaimer, the term of this patent is extended or adjusted under 35 U.S.C. 154(b) by 0 days.

(21) Appl. No.: 10/481,267

(22) PCT Filed: Jun. 19, 2002

(86) PCT No.: PCT/SE02/01201

§ 371 (c)(1), (2), (4) Date: May 26, 2004

(87) PCT Pub. No.: WO02/103721

PCT Pub. Date: Dec. 27, 2002

(65) Prior Publication Data

US 2004/0201290 A1    Oct. 14, 2004

(30) Foreign Application Priority Data

Jun. 19, 2001  (SE) .................................... 0102158
Feb. 18, 2002  (SE) .................................... 0200468

(51) Int. Cl.
*H02K 41/00*    (2006.01)

(52) U.S. Cl. ........................................ 310/12; 310/15
(58) Field of Classification Search ............ 310/12–15; 335/277; 280/5.5
See application file for complete search history.

(56) References Cited

U.S. PATENT DOCUMENTS

| 3,185,232 | A |   | 5/1965  | Iwasaki |
| 3,238,397 | A |   | 3/1966  | Maness |
| 3,549,916 | A | * | 12/1970 | Sherwood ................... 310/14 |
| 4,319,211 | A |   | 3/1982  | Ueda |
| 4,667,998 | A |   | 5/1987  | Borcea |
| 5,360,089 | A |   | 11/1994 | Nakamura |
| 5,416,293 | A | * | 5/1995  | Reneau ................ 200/61.45 M |
| 5,497,325 | A |   | 3/1996  | Mine |
| 5,572,426 | A |   | 11/1996 | Sasaki |
| 6,053,291 | A |   | 4/2000  | Shibahata |
| 6,405,841 | B1| * | 6/2002  | Zeno .......................... 188/267 |

FOREIGN PATENT DOCUMENTS

| DE | 2451718  | 5/1976 |
| DE | 3002382  | 7/1981 |
| EP | 3126467  | 1/1983 |
| EP | 0399326  | 11/1990 |
| EP | 0415780  | 3/1991 |
| EP | 0967316  | 12/1999 |
| JP | 10184755 | 7/1998 |
| JP | 10227322 | 8/1998 |
| JP | 10264635 | 10/1998 |
| JP | 10292847 | 11/1998 |
| JP | 10324129 | 12/1998 |
| JP | 11268512 | 10/1999 |

* cited by examiner

Primary Examiner—Thanh Lam
(74) Attorney, Agent, or Firm—Bingham McCutchen LLP

(57) ABSTRACT

The invention refers to an electromagnetic force device arranged to provide a force, a shock absorber with such a force device, a scale with such a force device, a sewing machine with such a force device and a handling device with such a force device. The force device includes an elongated holder element (1), a first magnet element (2), which is connected to the elongated holder element (1) in such a way stationary in relation to the holder element, a second magnet element (3), which is slidably connected to the elongated holder element (1) in such a way that it is displaceable along the holder element towards and away from the first magnet element (2). At least one of said magnet elements (2, 3) includes an electromagnet. An effect unit (10) is arranged to provide an electric effect to said electromagnet for generating a force in a first direction.

21 Claims, 12 Drawing Sheets

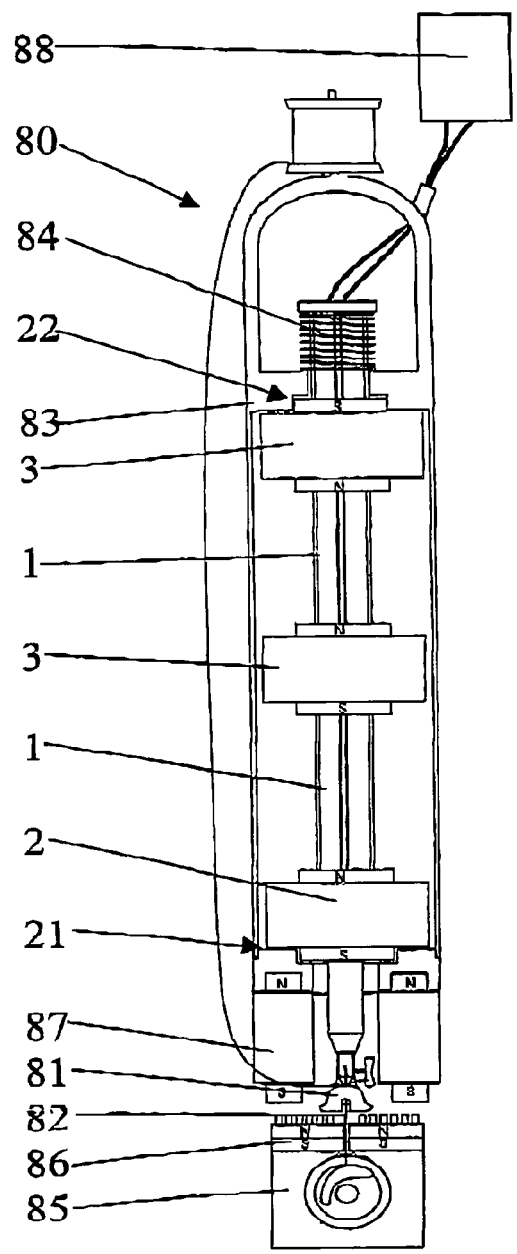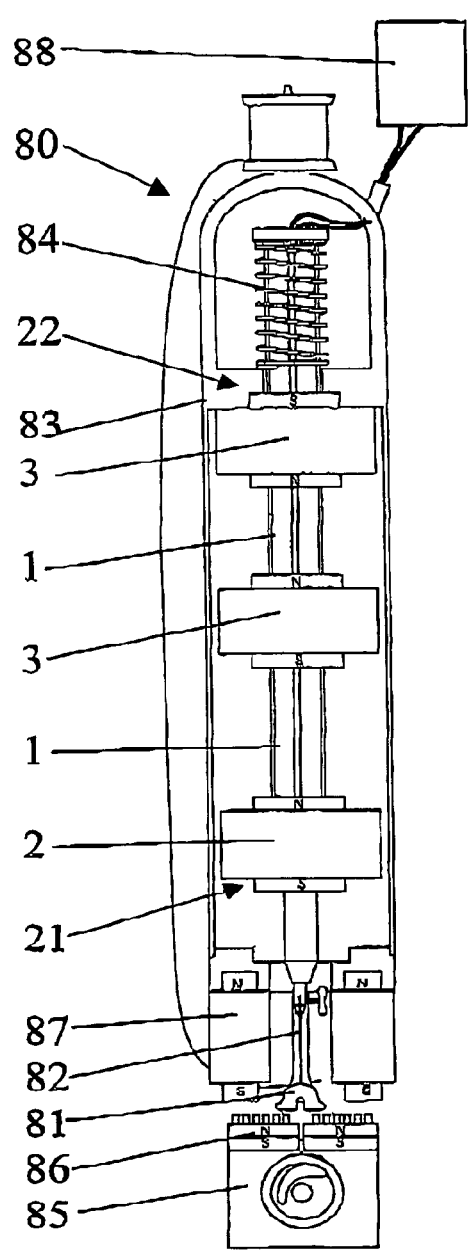

ELECTROMAGNETIC POWER DEVICE

BACKGROUND OF THE INVENTION AND PRIOR ART

The present invention refers to an electromagnetic force device arranged to provide a force. The invention also refers to a shock absorber, a scale, a sewing machine and a handling device, respectively, with such a force device.

Electric force devices are used in a plurality of various applications where there is a need of a force. The force may be utilised for moving an object along a straight or curved path in order to obtain a reciprocating movement, in order to tighten two objects towards or away from each other, etc. In such applications there is a need of force devices which are small and compact, which have a simple construction, which are cheap, which are reliable and which have a small energy consumption.

A concrete example of an application are active shock absorbers which are used in for instance motor vehicles and in the industry. By active shock absorbers are referred to such absorbers where the damping capability and the spring properties may be adjusted and adapted to various needs. U.S. Pat. No. 5,497,325 and U.S. Pat. No. 5,572,426 disclose two examples of active hydraulic shock absorbers, which have a relatively complicated constriction.

U.S. Pat. No. 3,238,397 discloses an electric machine with a reciprocating shaft, wherein a reciprocating movement is obtained by means of electromagnets arranged around the shaft.

SUMMARY OF THE INVENTION

The object of the present invention is to provide a force device which can meet the needs mentioned above.

This object is obtained by an electromagnetic force device Arranged to provide a force, which includes an elongated holder element, a first magnet element, which includes a first magnet and is connected to the elongated holder element in such a way that the first magnet element is substantially stationary in relation to the holder element, a second magnet element, which includes a second magnet and is slidably connected to the elongated holder element in such a manner that it is displaceable along the holder element towards and away from the first magnet element, wherein at least one of said magnet& includes an electromagnet, and an effect unit, which is arranged to provide an electric effect to said electromagnet for generating a force acting on the second magnet element in a first direction from the first magnet element.

By such a force device it is possible to generate a force in a determined and well defined direction. The force may be generated instantaneously since it is provided without any substantial delay when an electric effect, preferably in the form of a direct current, is supplied to the electromagnet or electromagnets by the effect unit. The force device according to the intention has a simple construction and may thus be manufactured at low costs. The force device according to the invention may obtain the desired physical dimensions and be made extremely compact or with a considerable length. The force device operates as a type of electric linear motor and may provide a movement with a stroke length which can be varied in various embodiments.

The first direction may extend along a straight path or along a curved path.

According to a further embodiment of the invention, the force device includes a third magnet element, which is slidably connected to the elongated holder element in such a manner that it is displaceable along the holder element in relation to the first magnet element and the second magnet element. The force device according to the invention may principally include an arbitrary number of magnet elements. In such a way, the generated force and the stroke length and physical length of the force device may be adapted to various needs and applications.

According to a further embodiment of the invention, the force device includes a spring member, which is arranged to provide a force acting on said slidable magnet element in a second direction opposite to the first direction. In such a manner, a movement in the opposite direction may be obtained when a low or no electric effect is supplied to said electromagnet. It is to be noted that it is also possible to let the effect unit provide said electric effect for generating a force acting on said slidable magnet element in a second direction opposite to the first direction. In such a manner, a movement or a pretensioning may be obtained in two opposite directions.

According to an embodiment of the invention, said slidable magnet elements include a respective carrying member, which is in slidable contact with the holder element and carries said magnet. Such a carrying member may have a low friction against the holder element and be arranged to carry substantially all components of the magnet elements. Also the stationary magnet element may include a carrying member which is fixedly connected to the holder element. In such a manner, all magnet elements are given the same size and same geometrical shape.

According to a further embodiment of the invention, the force device includes locking members arranged to prevent rotation of said magnet element in relation to the holder, Said locking member may advantageously include a primary locking member of the holder element and a secondary locking member of said magnet element, which locking members are arranged to coact with each other. For instance, said locking member may include a longitudinal groove and the other of said locking members includes a longitudinal key. Advantageously, the secondary locking member may be arranged on the carrying member.

According to a further embodiment of the invention, the holder element is designed as a rod and said magnet elements have an annular shape forming an opening, wherein the rod extends through said opening. Such a rod may be manufactured in an easy manner and provides a suitable guiding for the displaceable magnet element or magnet elements. Advantageously, said opening extends through the carrying member.

According to a further embodiment of the invention, said magnet includes a core of magnetic material carried by the carrying member. Such a core may advantageously substantially consist of solid magnetic material in the form of homogeneous iron, sintred iron powder or iron plates lying adjacent to each other. Furthermore, substantially all cores may have the same cross-sectional shape and be arranged in alignment with each other for the achievement of an efficiency.

According to a further embodiment of the invention, said electromagnet includes an annular core of magnetic material, wherein the core extends around the carrying member. The longitudinal key and groove mentioned above may in an elegant manner be provided on the rod and the carrying member.

According to a further embodiment of the invention, said electromagnet includes an electric winding which is connected to the effect unit by means of at least two connection conduits. Consequently, said electromagnet may be slidably arranged on the rod, wherein said connection conduits are designed as contact rails of the rod and wherein the electric winding is in electric contact with said contact rails via two slide contacts.

According to a further embodiment of the invention, the force device includes a first end portion, which is forward by one of the first magnet element and the holder element, and a second end portion which is formed by the second magnet element. Such end portions may be designed in various ways and adapted to the objects or devices with which the force device is intended to coact. The force device may thus be arranged to coact with a device and to apply said force to the device, wherein the first end portion is connectable to a first member of the device and the second end portion is connectable to a second member of the device.

An advantageous application of the invention is a shock absorber as defined above. Such a shock absorber may be designed as a shock absorber for motor vehicles including a vehicle chassis and a plurality of wheels which are intended to roll on the ground, wherein one of said end portions is connectable to the vehicle chassis and the other of said end portions is connectable to one of said wheels. Furthermore, the shock absorber may include a sensor device with at least a first sensor arranged to sense the distance between the vehicle chassis and the ground, and a control unit connected to the first sensor and arranged to control the output effect from the effect unit in response to the sensed distance. In such a way, one may substantially continuously read the road path and sense irregularities in the ground. Consequently, the length of the shock absorber and thus the position of the wheel concerned may substantially instantaneously be adapted to irregularities in the road path. Consequently, the force provided by the shock absorber may be adapted substantially instantaneously for minimising the shock arising in the vehicle. Advantageously, the sensor device may also include a second sensor, which is connected to the control unit and arranged to sense the distance between the vehicle chassis and the ground. The first sensor is preferably provided to sense the distance to the ground is in front of the wheel with regard to the normal moving direction of the vehicle whereas the second sensor is arranged to sense the distance to the ground behind the wheel with regard to the normal moving direction of the vehicle. Said sensor may advantageously include an optical distance measuring device.

Another advantageous application of the invention is a scale including an electromagnetic force element as defined above, wherein the second end portion is connected to a stationary element and the first end portion is connectable to an object to be weighed. The first end portion may be connected to a scale pan, wherein the second end portion may include or be connected to a frame for being placed on a substrate. The first end portion may also include or be connected to a hook or the like for weighing of suspended objects. Advantageously, the scale includes a sensor device with at least a first sensor, which is arranged to sense a distance depending an the distance between the stationary element and the first end portion, and a control unit, which is connected to the first sensor and arranged to control the output effect from the effect unit in response to the sensed distance. Said sensor may include an optical distance measuring device.

Further advantageous applications are given by a sewing machine with a force device as defined above and a handling device with a force device as defined above.

BRIEF DESCRIPTION OF THE DRAWINGS

The present invention is now to be explained more closely by means of a description of various embodiments and with reference to the drawings attached.

FIG. 10 discloses a schematic sideview of a sewing machine according to the invention in a first state.

FIG. 11 discloses a schematic sideview of the sewing machine in FIG. 10 in a second state.

DETAILED DESCRIPTION OF VARIOUS EMBODIMENTS OF THE INVENTION

Figure 1:
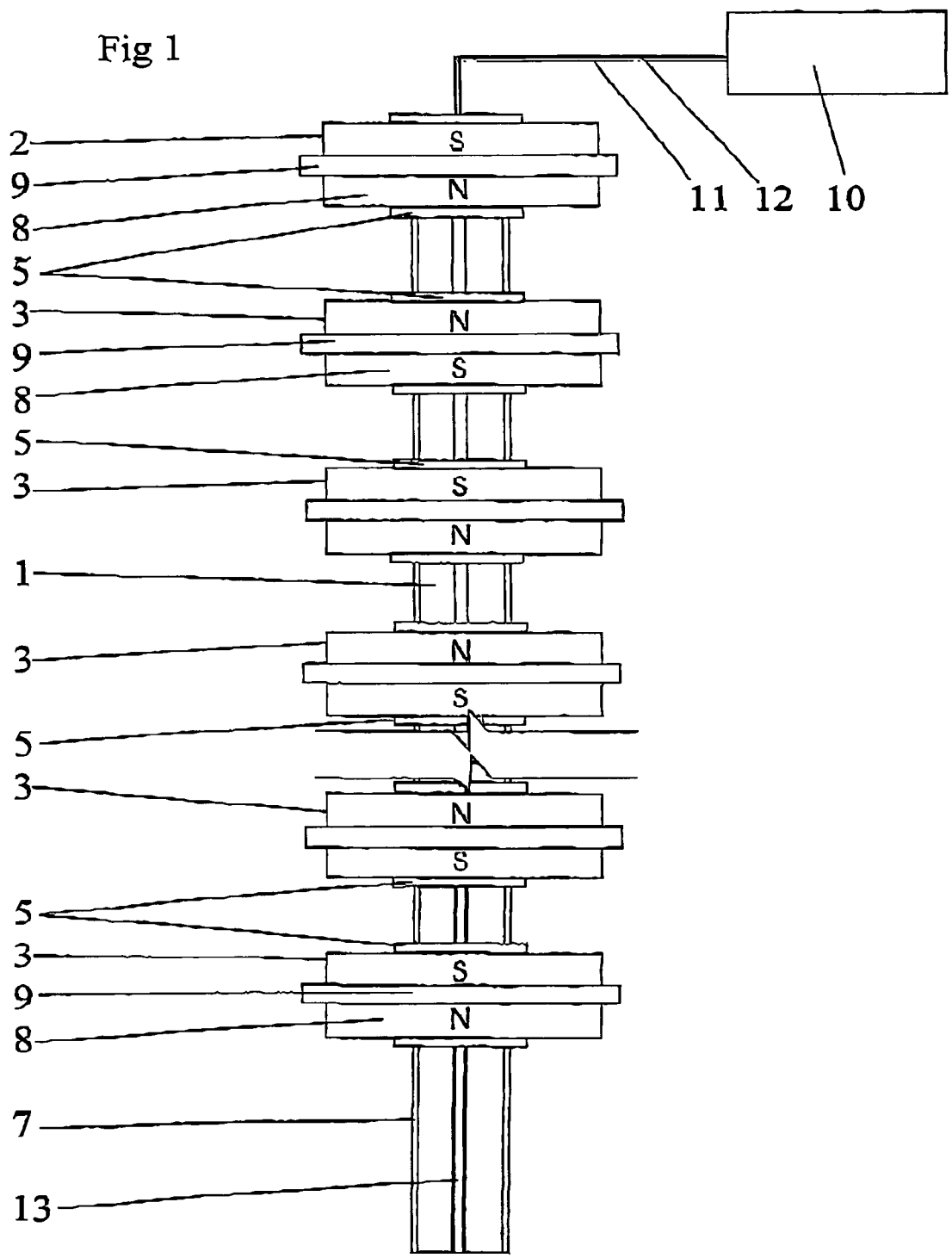
FIG. 1 discloses a sideview of a force device according to the invention.
Figure 3:
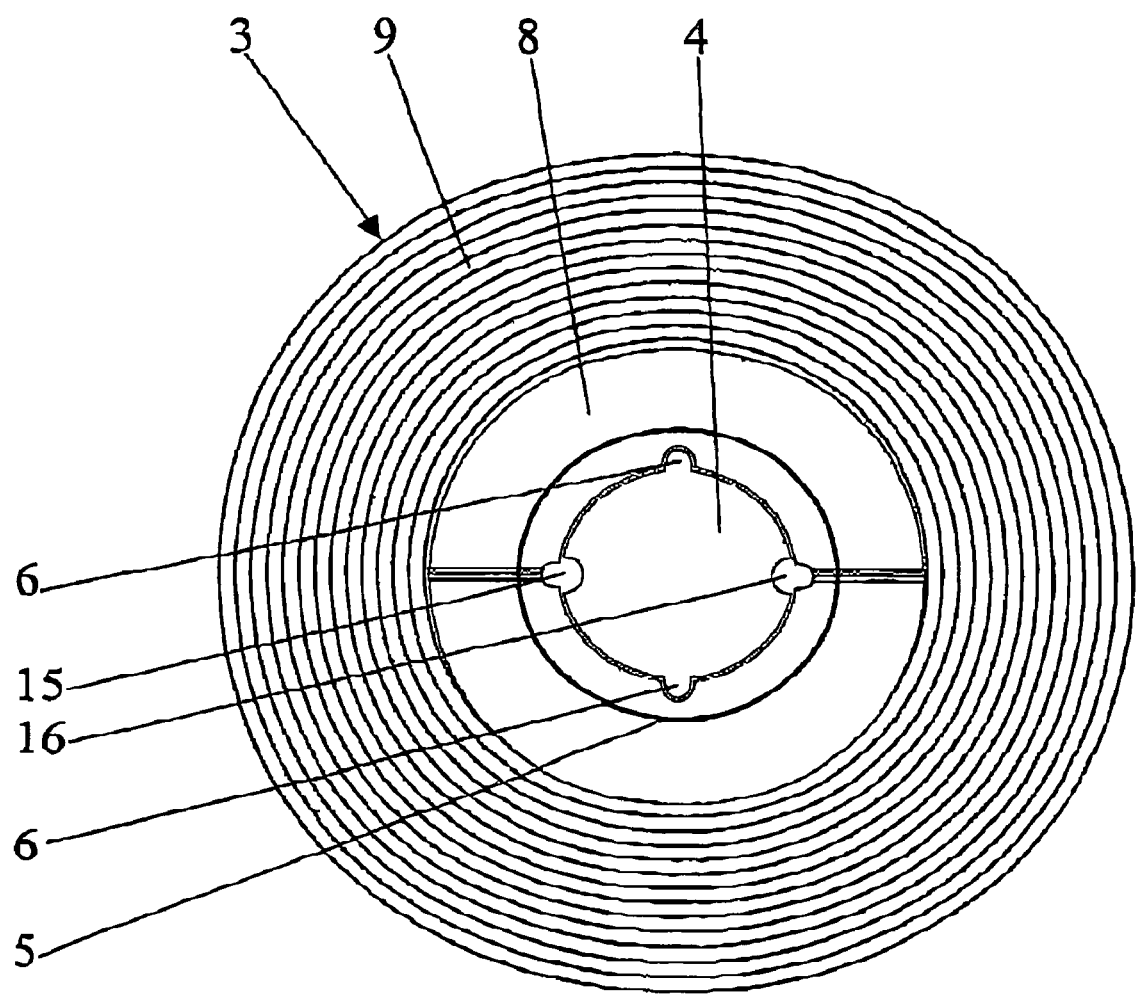
FIG. 3 discloses a plan view of a magnet element of the force device.

FIG. 1 discloses an electromagnetic force device arranged to provide a mechanical force. The force device includes an elongated holder element 1, which in this embodiment is designed as a rod. For the sake of simplicity, it is in the following referred to the rod 1. The rod 1 may be solid or hollow and manufactured of a substantially arbitrary material, for instance metal, plastics, composite materials such as carbon fibre or the like. The force device also includes a first magnet element 2 and a number of second, third, forth etc magnet elements 3. The first magnet element 2 includes a first magnet and is connected to the rod 1 in such a manner that the first magnet element 2 is substantially stationary in relation to the rod 1. The second magnet elements 3 include a second magnet and are slidably connected to the rod 1 in such a manner that they are displaceable along the rod 1 towards and away from the first magnet element 1. The magnet element 2, 3 have an annular shape forming an opening 4, see FIG. 3, through which the rod 1 extends.

At least the slidable magnet elements 3 includes a carrying member 5, which is in sliding contact with the rod 1 and which carries said magnet. Also the stationary magnet element 2 may include such a carrying member 5 which then is fixedly connected to the rod 1. The opening 4 extends as appears of FIG. 3 through the carrying member 5.

The force device also includes locking members which are arranged to coach with each other and prevent rotation of the magnet elements 2, 3 in relation to the rod 1. More specifically, the force device includes a primary locking member 6, 7 of the rod 1 and a secondary locking member 6, 7 of each of the magnet elements 2, 3, which is provided on and carried by the carrying member 5. In the embodiment disclosed, one of the locking members 6, 7 includes a longitudinal groove 6 and the other, coacting locking member 7, 6 a longitudinal key 7 intended to run in the groove 6. It is to be noted that the groove 6 may be arranged in the rod 1 or in the opening 4 of the carrying member 5 and that the key 7 consequently also may be provided on the rod 1 or on the carrying member of the magnet elements 2, 3 in such a manner that it projects into the opening 4.

The magnet of at least one of the magnet elements 2, 3 includes or consists of an electromagnet. The magnet of the remaining magnet elements 2, 3 may in a simple embodiment include or consist of permanent magnets. It is also possible to let the magnets of all magnet elements 2, 3 include or consist of electromagnets. For instance, the magnet of the first fixed magnet element 2 may include a permanent magnet whereas the magnet of the other moveable or slidable magnet element or magnet elements 3 include electromagnets. The arrangement may also be reversed in such a way that the magnet of the first magnet element 2 is an electromagnet whereas there is one or several moveable magnet elements 3 with magnets in the form permanent magnets.

Figure 2:
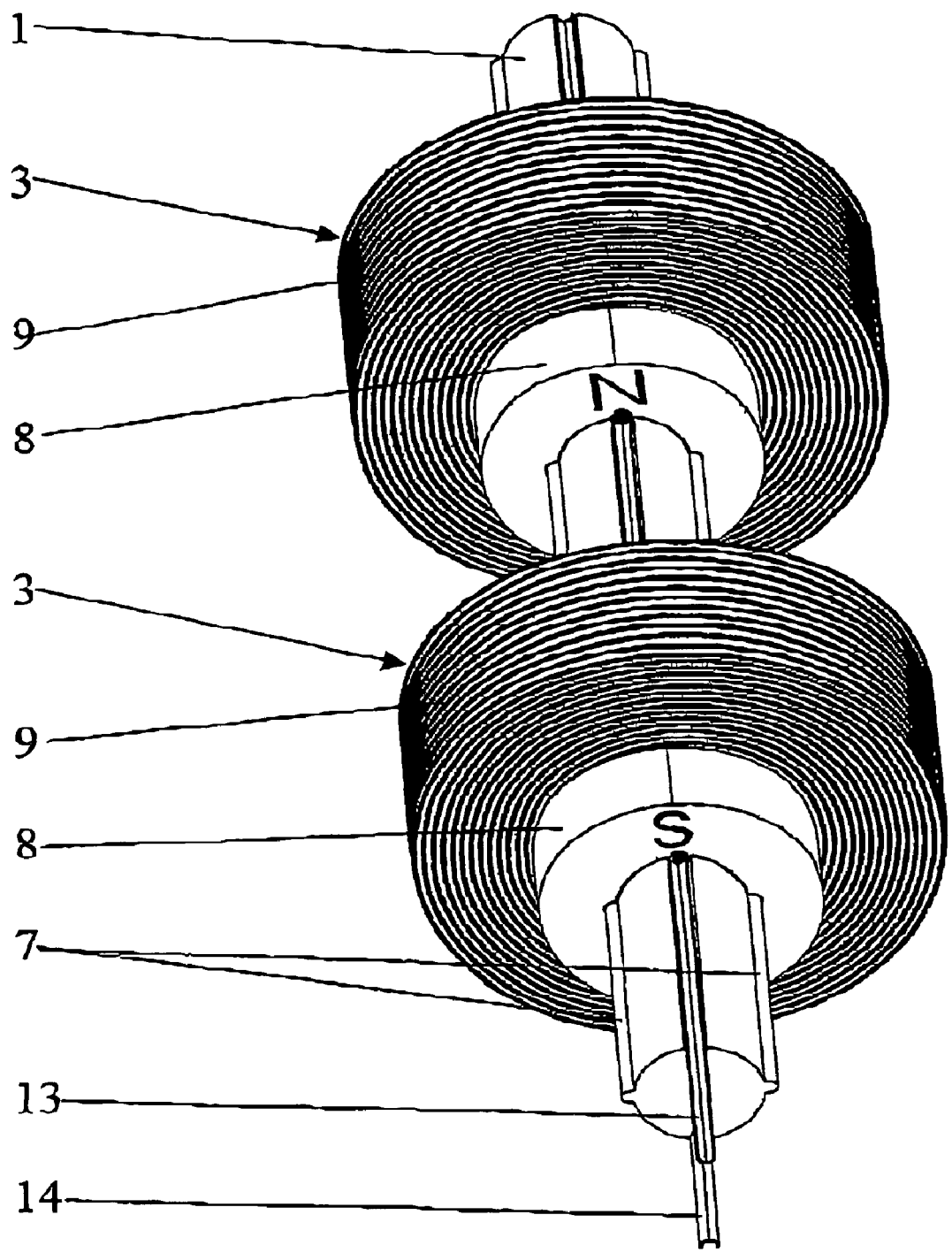
FIG. 2 discloses a perspective view of a force device according to the invention.

In the embodiment disclosed, the magnets of all magnet elements 2, 3 are electromagnet elements. Each electromagnet 2, 3 includes an annular core 8, which is provided on the carrying member 5 through which the opening 4 extends. The core 8 is manufactured of a solid magnetic material, such as homogeneous iron, sintred iron powder or iron plates, which are provided directly adjacent to each other and shaped as so called iron plate lamella. Each electromagnet 2, 3 also includes an electric conductor, forming an electric winding 9, which extends around the annular core 8. It is to be noted that the winding 9 only is disclosed schematically in FIG. 1 and that in reality may have other dimensions. When a current flows through the winding 9, the core 8 thus forms a magnet with a north pole N on one side and a south pole S on the other side, see FIGS. 1 and 2. Depending on the direction of the current through the winding 9 either the one or the other side will form the north pole N. The magnet elements 2, 3 are in the embodiment disclosed designed in such a manner that adjacent magnet elements are facing each other with same poles, i.e. a current through the windings 9 give rise to a repelling force between the magnet elements 2, 3.

The force device includes an effect unit 10, which is arranged to provide an electric effect to the electromagnet elements 2, 3, and more specifically to the electric winding 9 of each electromagnet 2, 3 via two connection conduits 11, 12. The connection conduits 11, 12 are partly designed as contact rails 13, 14 extending along the rod 1. In the embodiment disclosed in FIG. 2, the two contact rails extend in a respective groove 6 of the rod. The electric windings 9 of the magnet elements 2, 3 are in electric contact with the two contact rails via two sliding contacts 15, 16, see FIGS. 2 and 3. The sliding contacts 15, 16 are also provided on and thus carried by the carrying member 5. It is of course also possible to let the connection conduits 11, 12 extend from the effect unit 10 directly to each electric winding 8 as flexible cables. In the embodiment disclosed in FIGS. 1–3 the windings 8 are connected in parallel. It is of course also possible to connect the windings 9 in series with each other, for instance by providing more contact rails or by means of more flexible cables.

The effect unit 10 is arranged to provide the electric effect in the form of a direct current to the electromagnets 2, 3 for generating a force acting on the moveable magnet element or element 3 in at least one of a first direction from the first fixed magnet element 2. i.e. in such a manner that the magnet elements 2, 3 repel each other.

Figure 12:
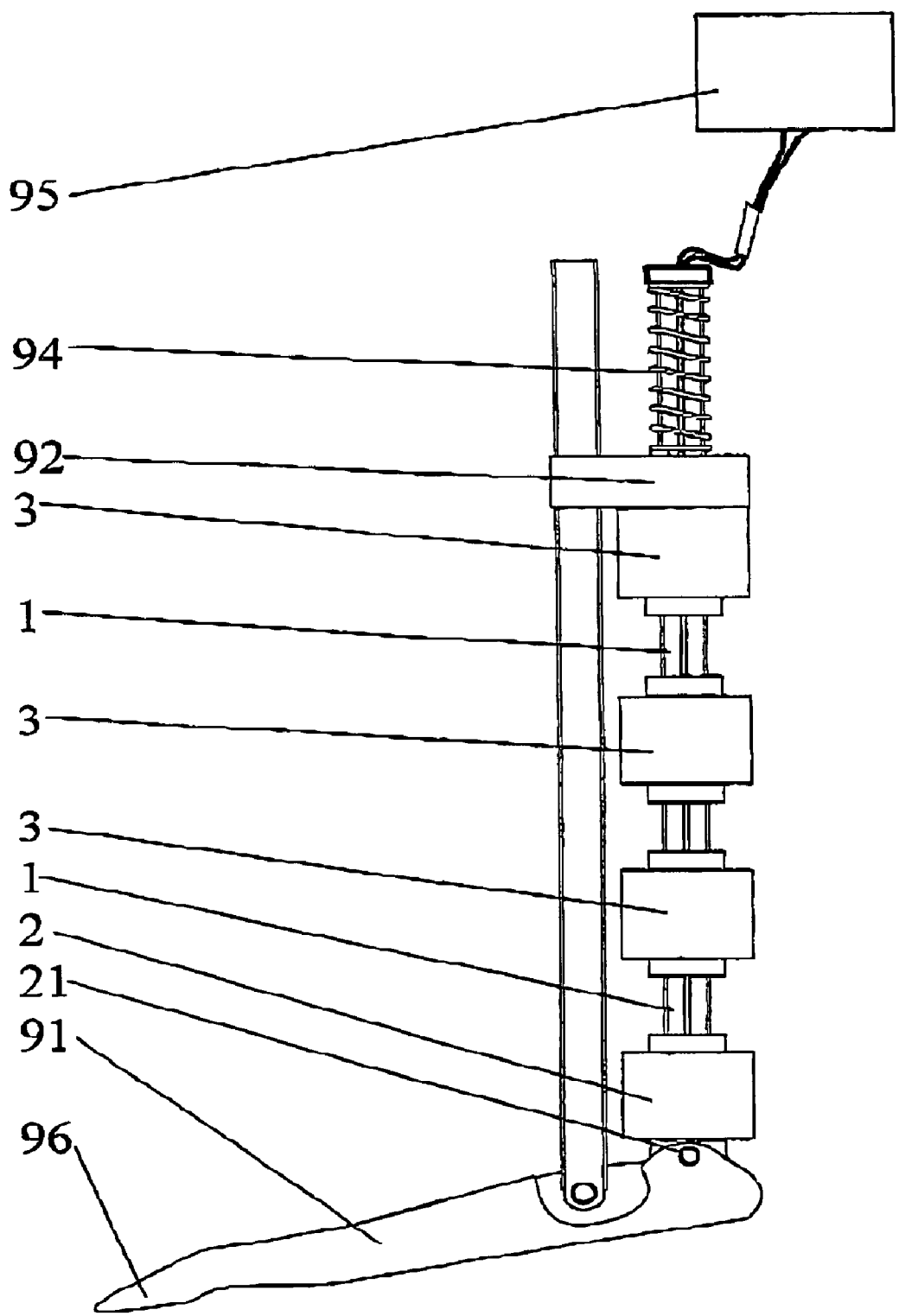
FIG. 12 discloser, a schematic sideview of a handling device according to the invention.

In another embodiment, the force device may also include a spring member 84, 94, see for instance FIGS. 10, 11 and 12, which is arranged to provide a force acting on the other moveable magnet element or elements 3 in a second direction which is opposite to the first repelling direction.

In a further embodiment, the effect unit 10 may also be arranged to provide an electric effect for generating a force acting on the moveable magnet element or elements 3 in a second direction which is opposite to the first direction. In this case, further connection conduits may for instance be provided in such a way that the direction of the current may be changed in for instance every second magnet element but maintain in the remaining magnet elements. Such a reciprocating movement may be obtained if at least one magnet element is or includes a permanent magnet whereas the direction of the current in the winding in the electromagnet element or electromagnet elements is changed by means of the effect unit.

The force device includes a first end portion 21, which is formed by one of the first fixed magnet element 2 and the rod 1, and a second end portion 22, which is formed by the second moveable magnet element 3. It is to be noted that the end portions 21, 22 do not necessarily need to be located at the geometrically outer ends of the force device. The force device is designed in such a manner that it may coact with a device and apply the force mentioned above to the device. In this connection, the first end portion 21 is connectable to a first member of the device and the second end portion 22 to a second member of the device.

Figure 4:
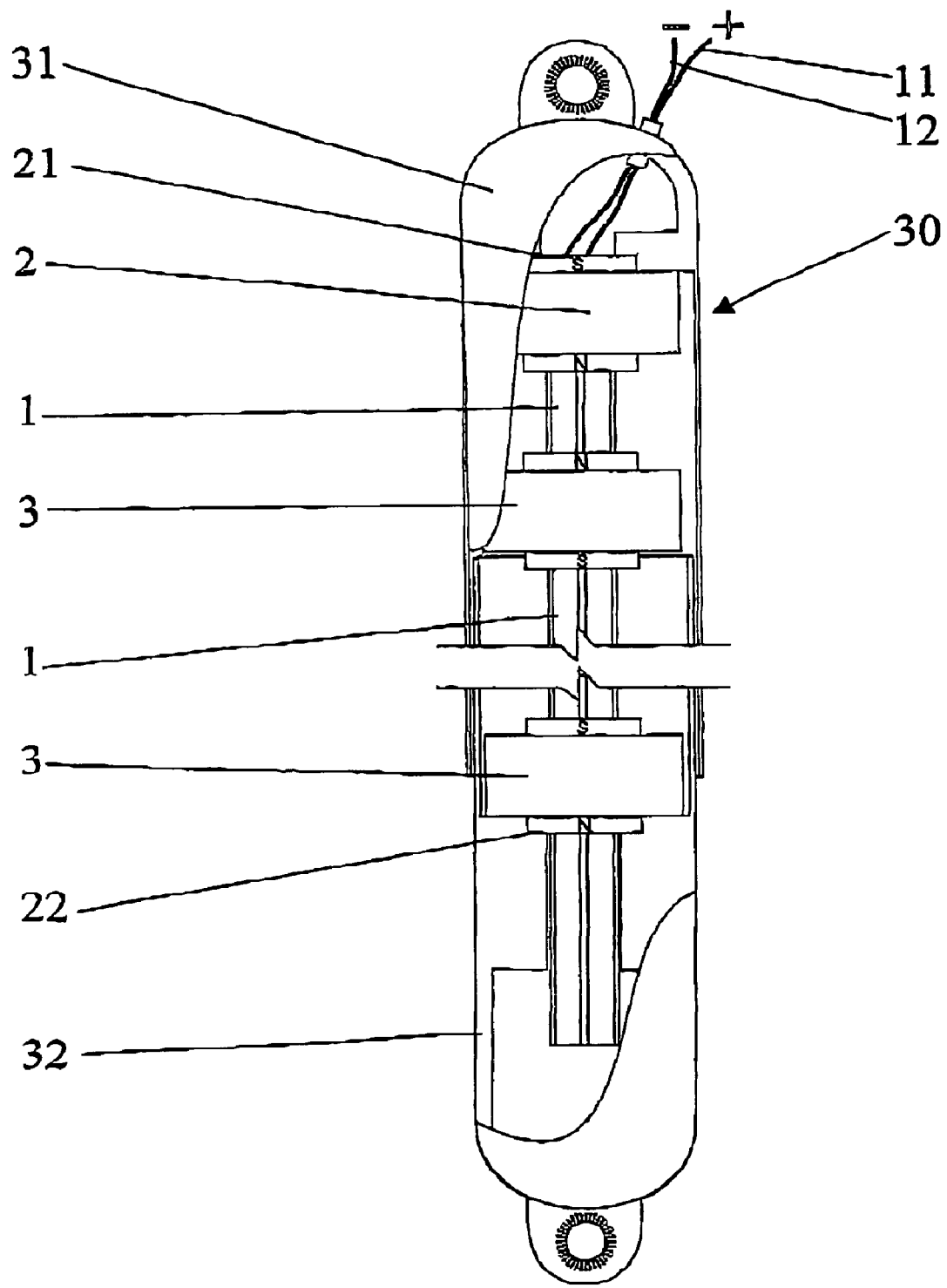
FIG. 4 discloses a sideview of a shock absorber according to the invention.

One example of such a device is a shock absorber 30, which is disclosed in FIG. 4. The shock absorber 30 includes a first pipe member 31, which is connected to the first end portion 21 of the force device, and a second pipe member 32, which is connected to the second end portion 22 of the force device ad telescopically introduceable into the first pipe member 31. The shock absorber 30 disclosed is designed in such a manner that it is suitable to be used in a motor vehicle, but the invention is not limited to a shock absorber for motor vehicles but may be utilised in many various applications where a shock absorber is needed. The shock absorber 30 also includes a first attachment member 33, which is provided on the first pipe member 31 and connectable to a schematically disclosed vehicle chassis 34 of a vehicle in a manner known per se, and a second attachment member 35, which is provided on the other pipe member 32 and connectable to a wheel 36 of the vehicle via the wheel axle of the wheel 36 in a manner known per se.

Figure 5:
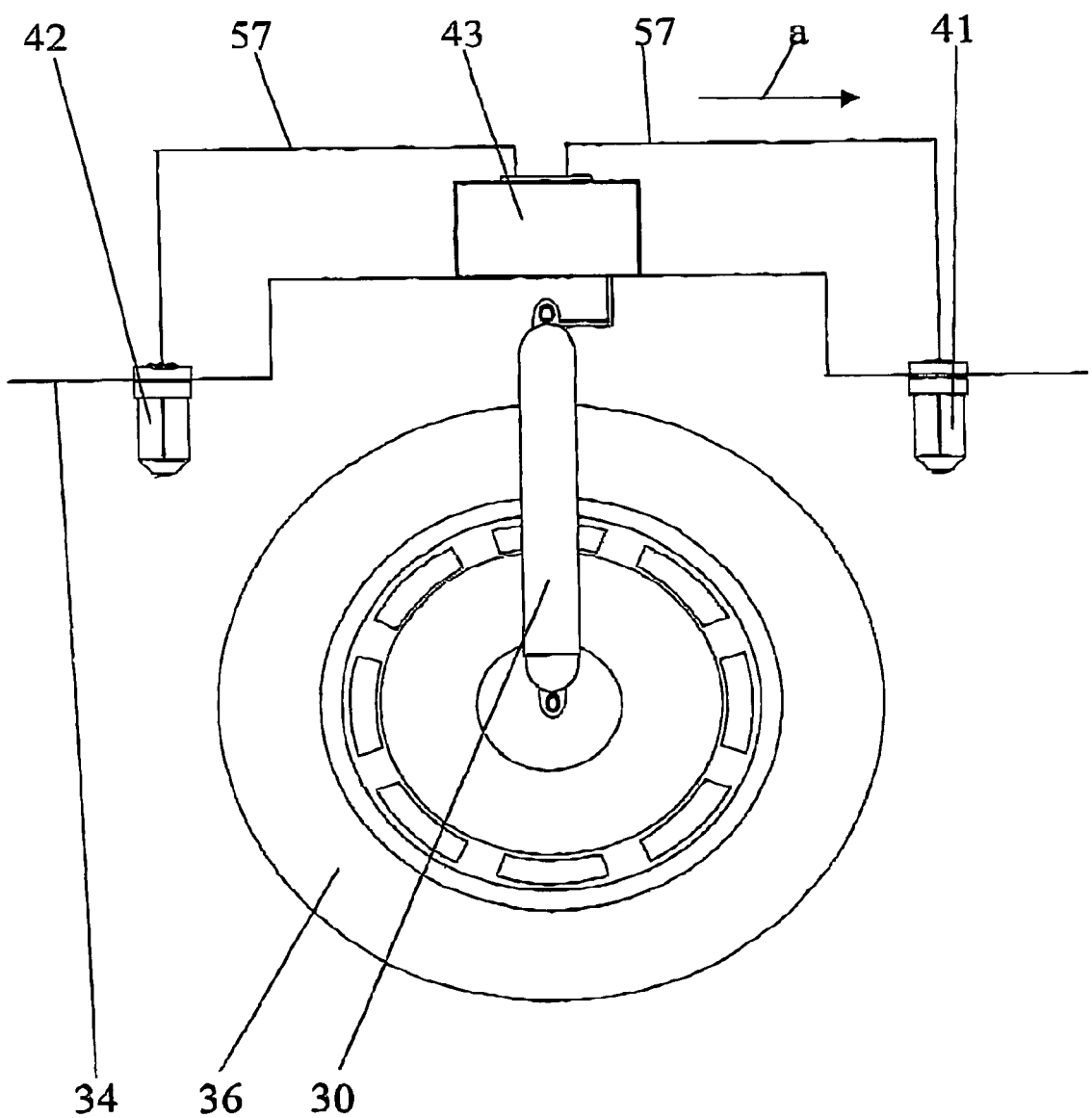
FIG. 5 discloses a sideview of shock absorber together with a vehicle wheel.

According to another embodiment, the shock absorber 30 includes a force device according to the description above with at least one electromagnet element 2, 3 and possibly a number of permanent magnet elements 2, 3. The magnet elements 2, 3 are arranged in such a way that the north poles N are facing each other and the south poles S are facing each other, i.e. all magnet elements 2, 3 repel each other. According to this embodiment, the shock absorber 30 may include or be connected to a sensor device, which in the embodiment disclosed includes a first sensor 41 and a second sensor 42, see FIG. 5. The sensors 41 and 42 our mounted on the chassis 34 of the vehicle and each sensor 41 and 42 is arranged to sense the distance to the ground, and more specifically the shortest distance between the sensor 41, 42 and the ground. The first sensor 41 is provided to sense the distance to the ground ahead of the wheel 36 with regard to the normal moving direction a of the vehicle whereas the second sensor 42 is arranged to sense the distance to the ground behind the wheel 36 with regard to the normal moving direction a of the vehicle. Each sensor 41, 42 preferably includes an optical distance measuring device that for instance may have the construction disclosed in FIG. 7. The sensor device also includes a control unit 43, which is connected to the first sensor 41 and the second sensor 42. The control unit 43 is arranged Lo control the output effect from the effect unit 10 in response to the sensed distance.

Figure 7:
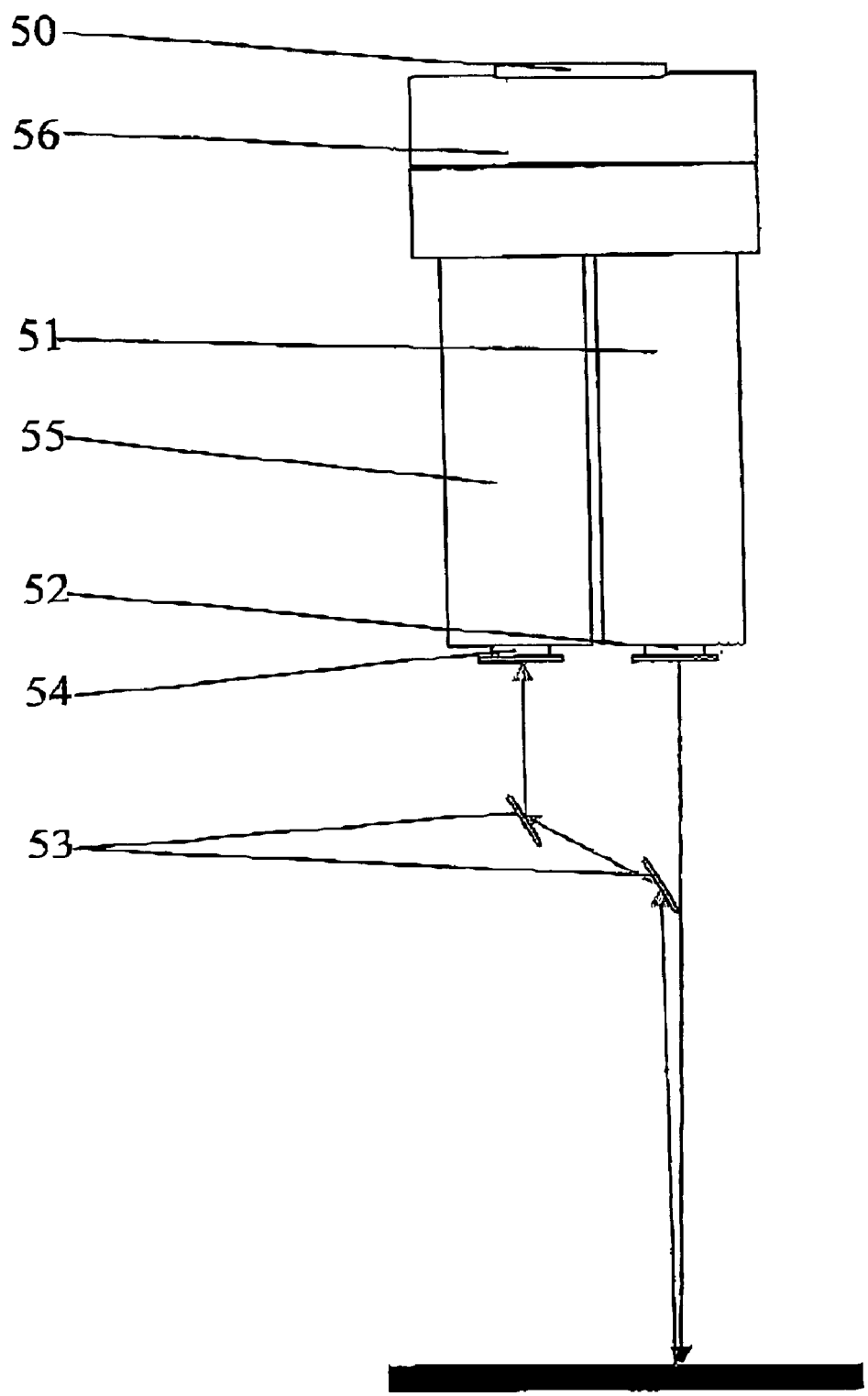
FIG. 7 discloses a sideview of a sensor device for the force absorber and the shock absorber.

The optical distance measuring device disclosed in FIG. 7 includes an interface 50 which is arranged to communicate with the control unit 43, an optical transmitter 51, for instance a laser, and a light opening 52 with a suitable optics. The transmitter 51 transmits a light beam through the opening 52 which in the application defined above hits the ground beneath the motor vehicle and is reflected. The reflected light beam is conveyed via reflectors 53 and suitable optics 54 to a receiver 55 transforming the light beam to an electric signal in a manner known per se. From the receiver 55 the electric signal is transferred to a processing unit 56, which processes the electric signal before it is communicated, via the interface 50, to the control unit 43, for instance by means of a connection conduit 57 or wireless transmission.

Figure 6:
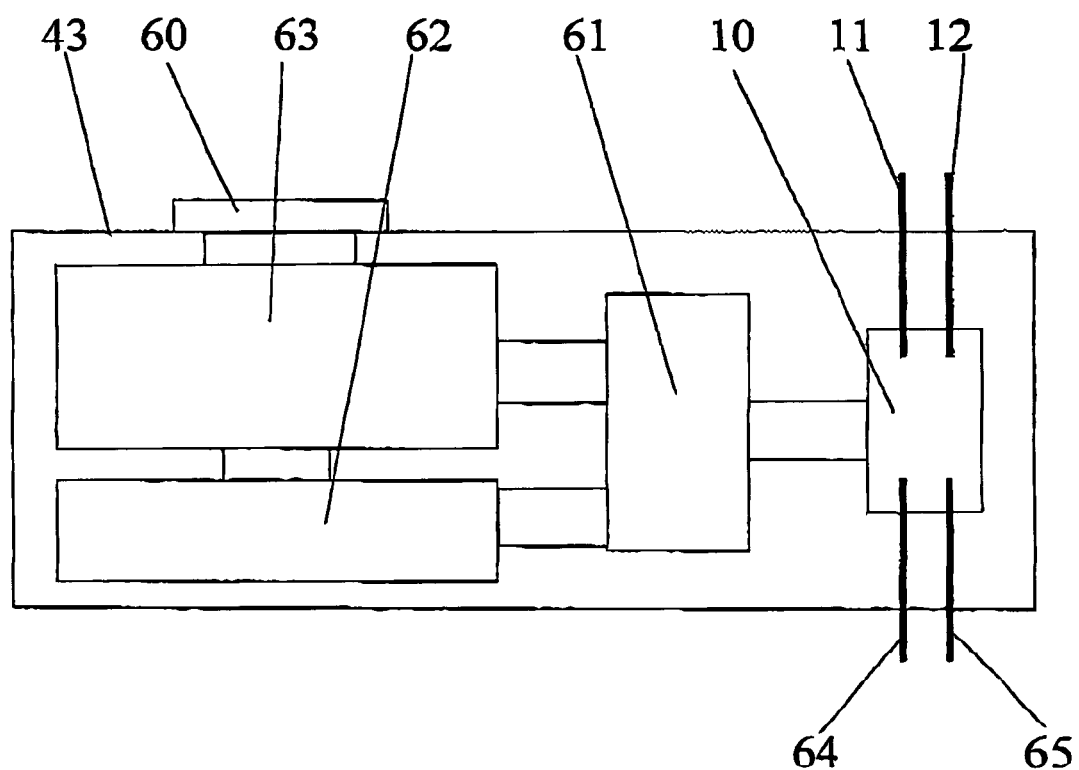
FIG. 6 discloses a schematic view of a control unit for the force device and a shock absorber.

One example of a control unit 43 is disclosed more closely in FIG. 6. In the control unit 43 disclosed, the effect unit 10 is included as a part of the control unit 43. It is of course possible to let the effect unit 10 constitute a separate unit if it is more advantageous in the actual application. The control Unit 43 disclosed also includes an interface 60 for communication with the sensors 41, 42 and possibly ocher sensors or units. Especially, the control unit 43 may via the interface 60 communicate with a unit delivering the instantaneous speed of the vehicle. Furthermore, the control unit includes a processor 61, a memory member 60 and possible further components 63. The processor 61 is connected to the effect unit 10 and thus controls time, size and direction of the effect to be delivered to the magnet windings 9 of the force device via the connection conduits 11 and 12 forming the output of the effect unit. The effect unit also has two inputs for conduits 64, 65 for the current supply, which for instance may be connected to the battery of the vehicle.

Figure 8:
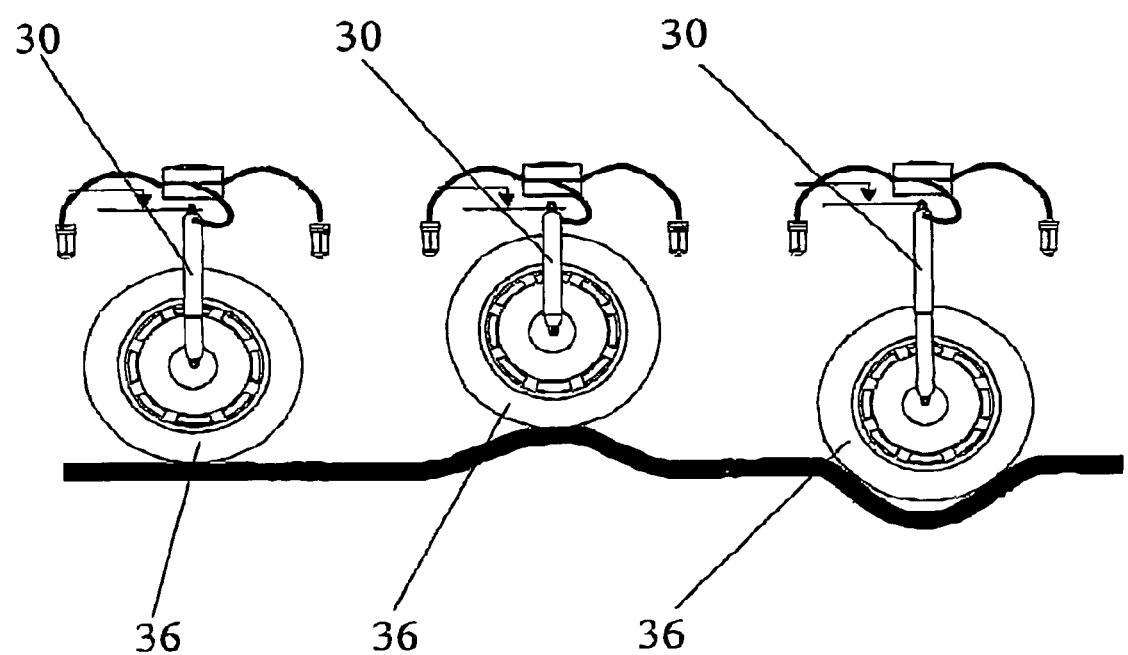
FIG. 8 discloses a sideview of the shock absorber in co-operation with a vehicle wheel.

FIG. 8 illustrates how the shock absorber 30 according to the invention coacts with the vehicle and the ground on which the vehicle is moved. As appears, the shock absorber 30 will adapt its length after the instantaneous distance of the vehicle 36 to the ground. Since the effect delivered to the force device is increased or reduced, the repelling force between the magnet elements may be increased or reduced and thus, the length of the shock absorber 30 may be increased or reduced to an extension which is related to the size of the effect.

Figure 9:
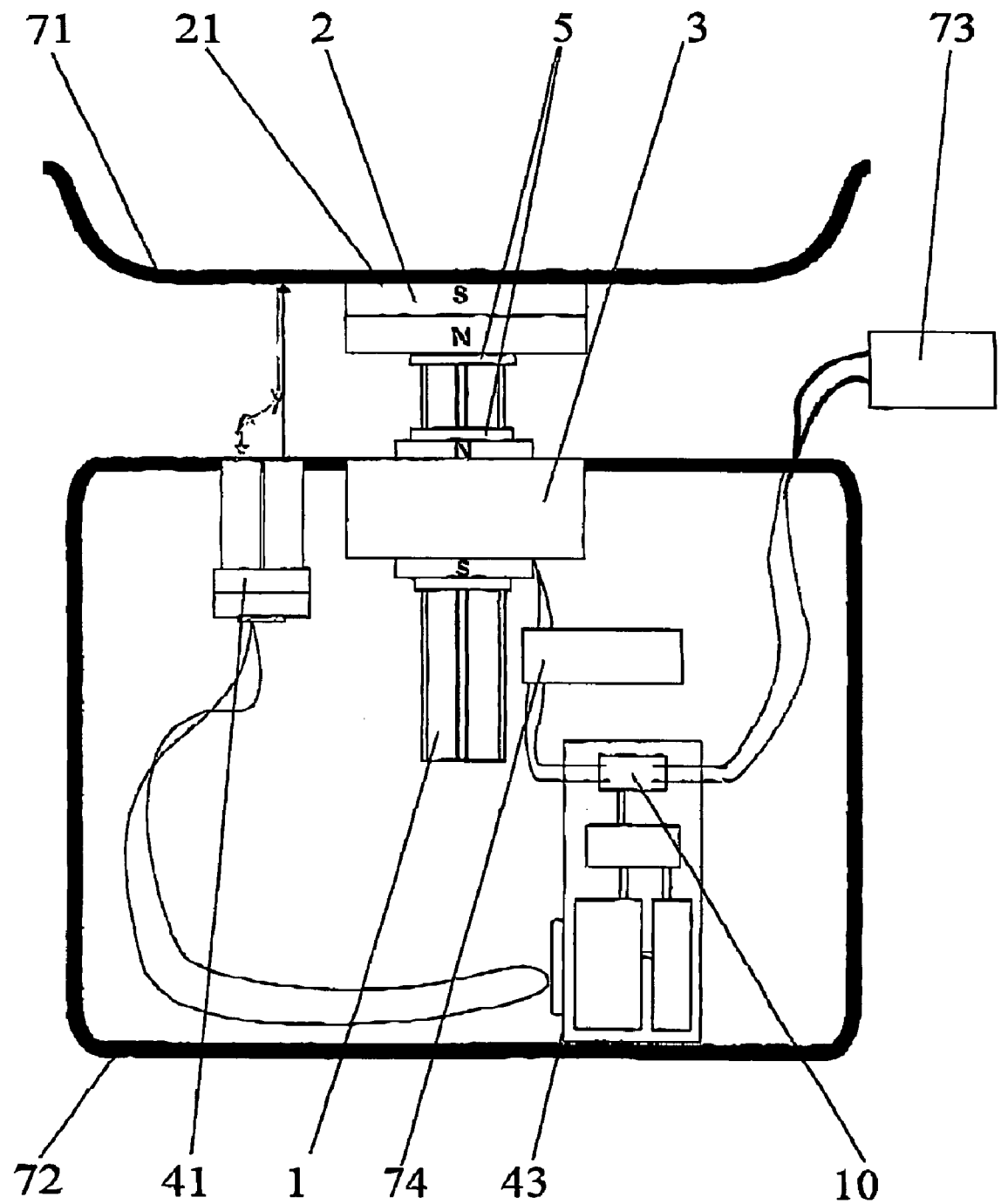
FIG. 9 discloses a schematic sideview of a scale according to the invention.

An example of another device where the electromagnetic force device according to the description above may be applied is a scale 70, see FIG. 9. The first and portion 21 of the electromagnetic force device is connectable to an object to be weighed. In the embodiment disclosed, the first end portion 21 is connected to a scale pan 71 on which said object may be placed. The second end portion 22 of the force device is connected to a stationary element 72 in the form of a frame to be placed on a suitable substrate.

The scale 70 includes a sensor device with a first sensor 41, which may in principle be of the same type as the sensor 41 described above in connection with the shock absorber 30. The sensor 41 is arranged to sense a distance depending on the distance between the frame 72 and the first end portion 21, or in the embodiment disclosed the scale pan 71. The scale 70 also includes a control unit 43 that also may be of principally the same type as the control unit 43 described above in connection with the shock absorber 30. The control unit 43 in connected to the sensor 41 and a current supply 73, for instance a battery. The control unit 53 is arranged to control the output effect from the effect unit 10 in response to the sensed distance wherein the effect supplied to the force device relates in a determined manner to the weight of the object to be weighed. The weight as a function of the current may thus be measured and disclosed with a display member 74.

An example of a further device where the electromagnetic force device according to the description above may be applied is a sewing machine 80, see FIGS. 10 and 11. The electromagnetic force device disclosed includes a rod 1, a first magnet element 2, which is fixedly provided on the rod 1 and two second magnet elements 3 which are displaceable on the rod 1 in the first direction away from the first magnet element 2. The first end portion 21 of the electromagnetic force device is connected to a slide 91, which is arranged to hold a sewing needle 82 and slide on the fabric or the like to be sewed. The second end portion 22 of the force device is connected to a housing 83 forming the outer casing of the sewing machine 80. The first end portion 21 is displaceable in the housing 83. The second end portion 22 includes a spring member 84, which is arranged to provide a force acting on the outermost second magnet element 3 in a second direction which is opposite to the first direction. The sewing machine also includes a counter member 85, which is arranged to provide an under-thread and to press said fabric between the counter member 85 and the slide 81. In the embodiment disclosed, the force pressing the counter member against the slide is thus obtained by means of the magnet members 86 and 87. A first such magnet member 86 is arranged on the counter member and a second such magnet member 87 is arranged on or in the housing 83. The magnet members 86, 87 may include permanent and/or electromagnets. Furthermore, the sewing machine 80 may include a schematically disclosed effect and/or control unit 88, which is arranged to provide a discontinuous electric effect. The unit 88 may be mounted in the housing 83.

By supplying an electric effect to the magnet elements 2 and/or 3, by means of the effect unit 88, the magnet elements 2, 3 will repel each other and thus move the needle 81 through said fabric into the counter member 85 against the action of the spring 84, see FIG. 10. When the effect supply is interrupted, the spring 84 will lift the needle back into the housing 83, see FIG. 11.

An example of a further device where the electromagnetic force device according to the description may be applied is a handling device 90, see FIG. 10 Such a handling device may for instance be included in a robot or any similar apparatus for moving itself or for moving objects. The force device may then be arranged to provide the moving movement or a movement for gripping an object. FIG. 12 illustrates an example of a robot foot. The electromagnetic force device disclosed includes a rod 1, a first magnet element 2, which is fixedly provided on the rod 1 and three second magnet elements 3 which are displaceable on the rod 1 in the first direction away from the first magnet element 2. The first end portion 21 of the electromagnetic force device is pivoteably connected to a robot arm or a robot foot 91. The second end portion 22 of the force device is connected to a holding member 92 which is fixedly provided on a further elongated robot arm 93, which has an outer end that also is pivoteably connected to the robot foot 91. The second end portion includes spring member 94 which is arranged to provide a force acting on the outermost second magnet element 3 in a second direction which is opposite to the first direction. By supplying an electric effect to the magnet elements 2 and/or 3 by means of an effect unit 95, the magnet elements 2, 3 will repel each other and thus displace the outer end 96 of the robot foot 91 upwardly in FIG. 12. When the effect supply is interrupted, the spring member 94 will displace the outer end 96 of the robot foot 91 back downwardly in FIG. 12.

Figure 13:
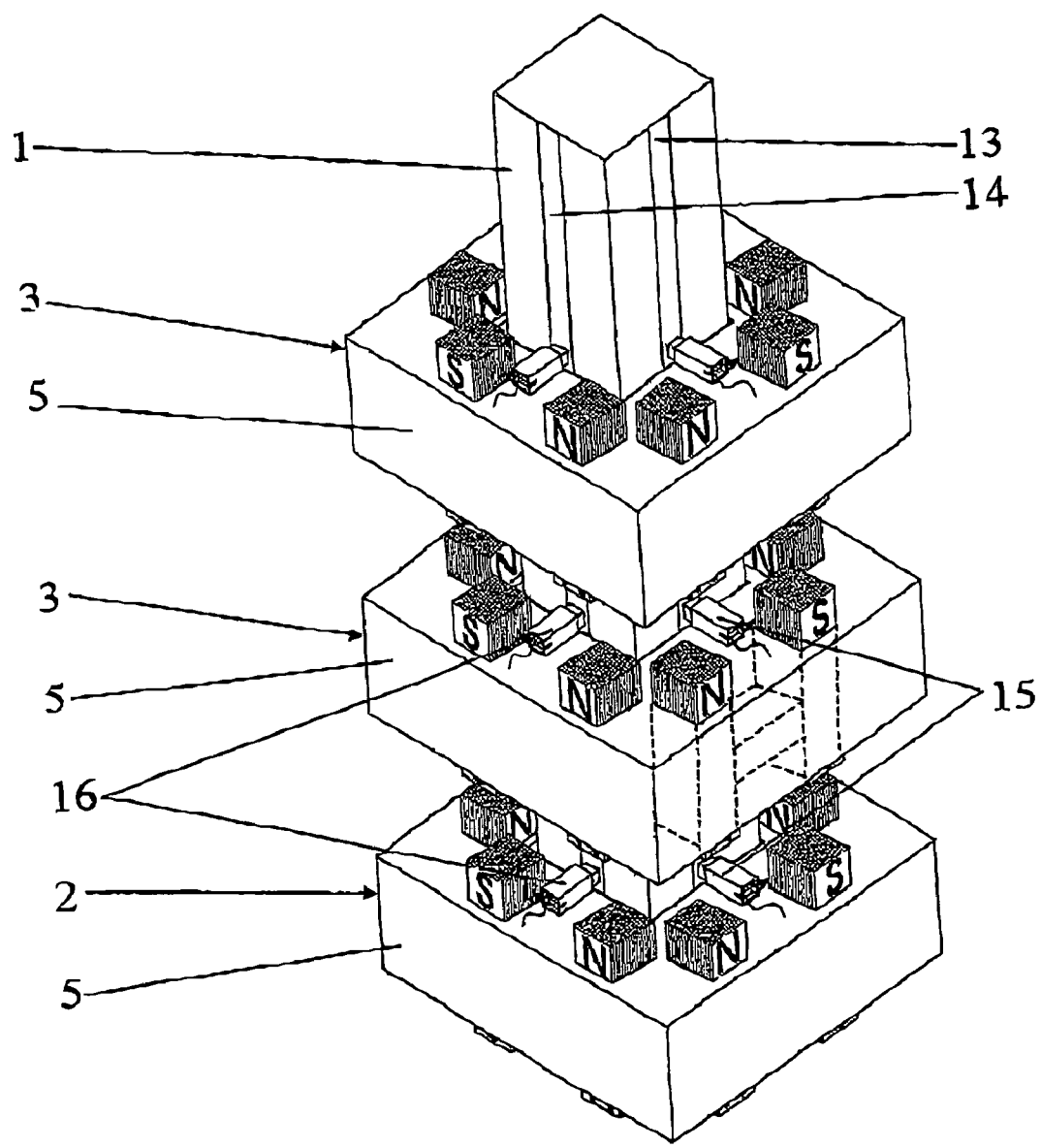
FIG. 13 discloses a perspective view of a force device according to the invention with magnet elements of an alternative design.

FIG. 13 discloses another embodiment of the force device with a holder element in the form of a rod 1 with a substantially rectangular cross-section. A first stationary magnet element 2 with four electromagnets is provided around the rod 1 and two slideable magnet elements 3 each with four electromagnets are provided around the rod 1. Each magnet element 2, 3 includes a carrying member 5 which carries the four electromagnets. Each electromagnet may have an H-like shape, which is indicated with dotted lines for an electromagnet in FIG. 3. The winding 9 (not disclosed) is located within the carrying member and may extend around the transversal member of the H-like electromagnet. The rod 1 includes four contact rails 13, 14 and each carrying member 5 carries sliding contacts 15, 16 for connection of the electric windings of each electromagnet to the effect unit 10 (not disclosed). As clearly illustrated in this embodiment, the annular carrying member 5 may also have another than a circular shape, for instance a rectangular or square shape.

The invention is not limited to embodiments disclosed but may be modified and varied within the scope of the following claims. For instance, it may be noted that the force device according to the invention may be utilised in a plurality of various applications except the two applications which have been described above.

The invention claimed is:

1. An electromagnetic force device arranged to provide a force, wherein the force device includes a first end portion and a second end portion, the force device including:
   an elongated holder element, designed as a rod;
   a first magnet element, which includes a first magnet and is connected to the elongated rod in such a way that the first magnet element is substantially stationary in relation to the rod;
   a second magnet element, which includes a second magnet and is slidably connected to the rod in such a manner that it is displaceable along the rod towards and away from the first magnet element, wherein at least one of said magnets includes an electromagnet;
   a locking member arranged to prevent rotation of said magnet elements in relation to the rod, said locking member including a primary locking member of the rod and a secondary locking member of said magnet elements, which locking members are arranged to coact with each other; and
   an effect unit, which is arranged to provide an electric effect to said electromagnet for generating a force acting on the second magnet element in a first direction from the first magnet is element, wherein the first end portion and the second end portion will approach each other when the first and second magnet elements approach each other, and become more distant from each other when the first magnet and the second magnet become more distant from each other.

2. The electromagnetic force device according to claim 1, wherein the force device includes a third magnet element which is slidably connected to the elongated holder element in such a manner that it is displaceable along the bolder element towards and away from the first magnet element and the second magnet element.

3. The electromagnetic force device according to claim 1, wherein each magnet element includes a north pole and a south pole, wherein adjacent magnet elements are provided with the same poles facing each other.

4. The electromagnetic force device according to claim 1, wherein said slidable magnet element includes a respective carrier member, which is in slidable contact with the holder element and carries said magnet.

5. The electromagnetic force device according to claim 1, wherein one of said locking members includes a longitudinal groove and the other of said locking members includes a longitudinal key.

6. The electromagnetic force device according to claim 1, wherein the primary locking member is provided on the carrying member.

7. The electromagnetic force device according to claim 1, wherein said magnet element has an annular shape forming an opening, wherein the rod extends through said opening.

8. The electromagnetic force device according to claim 4, wherein said opening extends through the carrying member.

9. The electromagnetic force device according to claim 1, wherein said magnet includes a care of a magnetic material carried by the carrying member.

10. The clectromagnetic force device according to claim 9, wherein the core substantially consists of solid magnetic material in the form of homogeneous iron, sintered iron powder or iron plates lying adjacent to each other.

11. The electromagnetic force device according to claim 9, wherein substantially all cores have the same cross-section shape and are provided in alignment with each other.

12. The electromagnetic force device according to claim 9, wherein said electromagnet includes an annular core of magnetic material wherein the core extends around the carrying member.

13. The electromagnetic force device according to claim 1, wherein said electromagnet includes an electric winding, which is connected to the effect unit by means of at least two connection conduits.

14. The electromagnetic force device according to claim 13, wherein said electromagnet is slidably provided on the rod, wherein said connection conduits are at least partly designed as contact rails of the rod and wherein the electric winding is in electric contact with said contact rails via two slide contacts.

15. The electromagnetic force device according to claim 1, wherein the first end portion is formed by one of the first magnet element and the holder element, and the second end portion is formed by the second magnet element.

16. The electromagnetic force device according to claim 15, wherein the force device is arranged to coact with a device and to apply said force to the device, wherein the first end portion is connectable to a first member of the device and the second end portion is connectable to a second member of the device.

17. A shock absorber including an electromagnetic force device according to claim 15.

18. The shock absorber according to claim 17, wherein the chock absorber is designed as a shock absorber for motor vehicles including a vehicle chassis and a plurality of wheels that are intended to roll on the ground, wherein one of said end portions is connectable to the vehicle chassis and the other of said end portions is connectable to one of said wheels.

19. The shock absorber according to claim 18, wherein the shock absorber includes a sensor device with at least a first sensor supported by the vehicle chassis and arranged to sense the distance to the ground, and a control unit which is connected to the first sensor and arranged to control the output effect from the effect unit in response to the sensed distance.

20. The shock absorber according to claim 19, wherein the sensor device also includes a second sensor, which is connected to the control unit and which also is supported by the vehicle chassis and is arranged to sense the distance to the ground.

21. The shock absorber according to claim 19, wherein said sensor includes an optical distance measurement device.

* * * * *